United States Patent [19]

Collier et al.

[11] 4,079,485

[45] Mar. 21, 1978

[54] BUNDLE TIE

[75] Inventors: John Covell Collier; Leonard John Owen, both of Exeter, England

[73] Assignee: AMP Incorporated, Harrisburg, Pa.

[21] Appl. No.: 793,565

[22] Filed: May 4, 1977

[30] Foreign Application Priority Data

May 25, 1976 United Kingdom ............... 21520/76

[51] Int. Cl.² .............................................. B65D 63/00
[52] U.S. Cl. ................................. 24/16 PB; 24/30.5 P
[58] Field of Search ............ 24/16 PB, 73 PB, 206 A, 24/150 FD, 30.5 P; 248/74 PB

[56] References Cited

U.S. PATENT DOCUMENTS

| 3,581,347 | 6/1971 | Verspieren | 24/16 PB |
| 3,819,139 | 6/1974 | Jemison | 24/16 PB |
| 3,900,923 | 8/1975 | Thomas | 24/16 PB |
| 4,028,777 | 6/1977 | Schobel et al. | 24/16 PB |

Primary Examiner—Henry S. Jaudon
Attorney, Agent, or Firm—Allan B. Osborne; William J. Keating; Jay L. Seitchik

[57] ABSTRACT

A flexible plastics bundle tie comprising a strap extending from an apertured frame for passage of the strap looped back on itself, is provided at the frame with means for releasably engaging the frame of a similar tie to form a stack in which the straps are generally parallel. The means may comprise a tongue projecting from the frame on a side opposite to the strap engaging the aperture of the adjacent frame.

12 Claims, 9 Drawing Figures

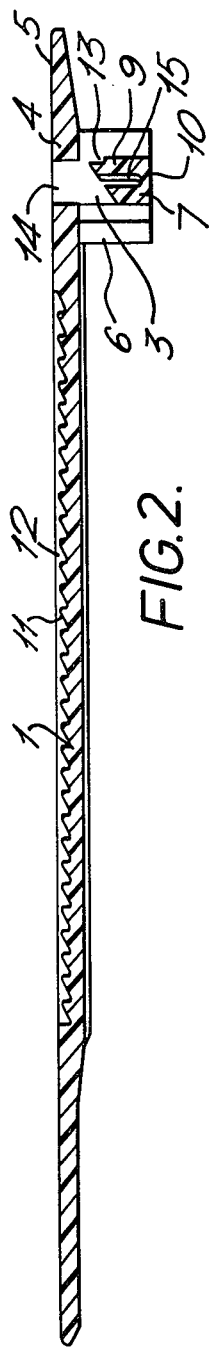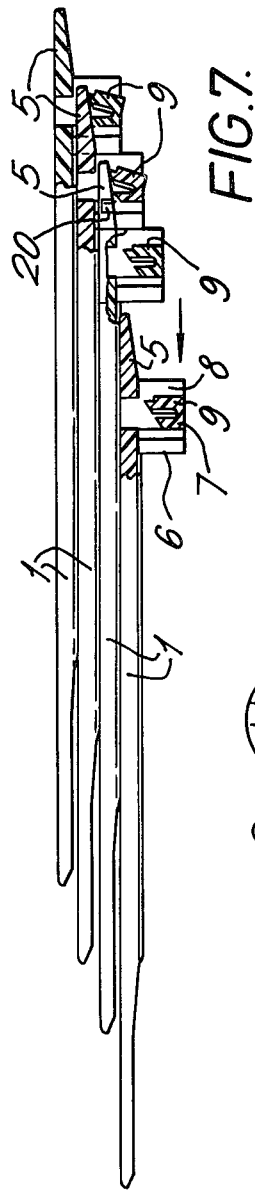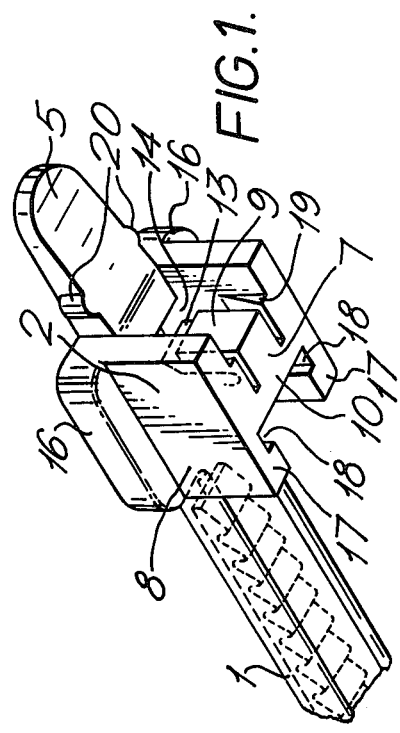

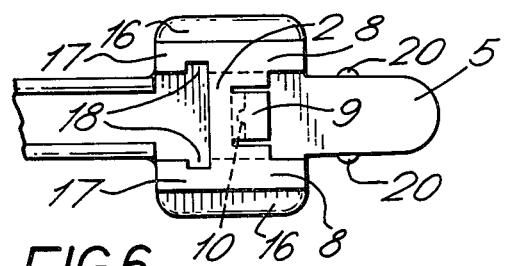
FIG.6.  FIG.5.
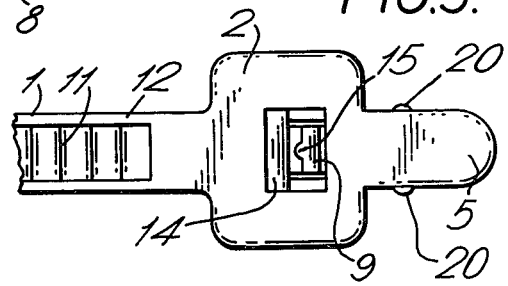
FIG.4.  FIG.3.
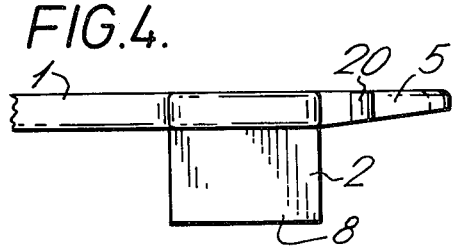
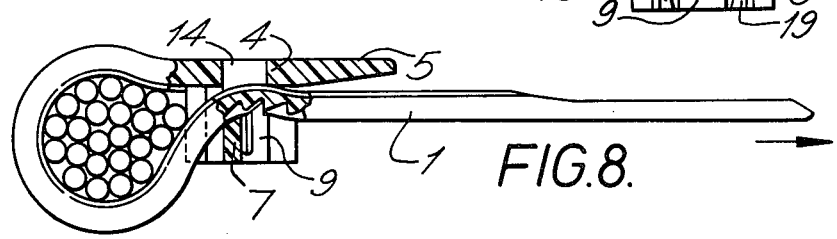
FIG.8.
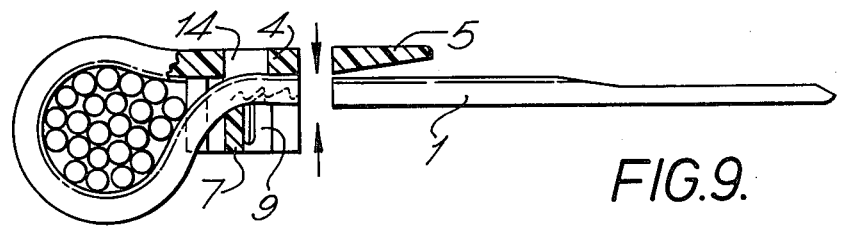
FIG.9.

BUNDLE TIE

This invention relates to bundle ties such as are used for tying insulated conductors or other elongated members into a bundle.

A common type of bundle tie is moulded from flexible plastics material and comprises an elongate flexible strap portion having an open frame at one end, the frame forming a passage into which the other end of the strap may be inserted and through which the strap may pass, the frame having means for engaging the strap within the frame to resist its withdrawal. Such cable ties may be used individually and may be packaged loose in a box or bag, or bundled, or they may be required for use in a manual, automatic, or semi-automatic tool for which purposes they may be pre-packaged in a magazine.

It is an object to provide an improved bundle tie which facilitates packaging for handling purposes and for use in an automatic or semi-automatic tool.

In a bundle tie or the type specified, according to the present invention the frame has means for releasably engaging the frame of a similar, adjacent tie to form a stack in which the straps of the ties are generally parallel and extend forwardly from the frames in the same direction.

The invention also includes a bundle tie of the type specified, in which the frame is provided with a tongue on a side of the frame opposite the strap and, on the side adjacent the strap, the frame is formed with an aperture complementary to the tongue and adapted releasably to engage the tongue of a second, similar tie with the strap portions of the ties in side-by-side overlapping relationship.

Suitably the aperture for receiving the tongue also defines the passageway for receiving the other end of the strap, the passageway extending through the frame in a direction generally parallel to the strap and the tongue, the tongue effectively forming an extension of the strap on the opposite side of the frame.

Preferably the frame, at its floor is flush with a face of the strap and projects from the other face of the strap to a roof or head portion, spaced from the floor by the aperture defining the passageway.

In one embodiment, the strap is formed on the face flush with the base of the frame with serrations defining ratchet teeth adapted to engage a resilient pawl supported from the head of the frame and positioned within the aperture to resist withdrawal of the strap when looped back upon its length so that the other, free end enters the passageway at the one end of the strap. Suitably the serrations are recessed below the surrounding surface of the strap and on the opposite side the strap is of shallow channel form.

The strap, frame, tongue and latch are suitably integrally formed in one piece and the floor of the frame opposite the latch and the head is suitably formed with an aperture for access of mould tooling.

The free end of the tongue on the surface adjacent the projecting portion of the frame is suitably chamfered to facilitate insertion into the aperture of a complementary tie, and the head and latch are suitably chamfered in complementary manner.

To facilitate releasable latching engagement of the tongue in a complementary aperture, the tongue is suitably formed on its side edges with small bosses or transverse ribs adapted to engage in complementary slots in the frame head portion at the entry end of the aperture. Alternatively the tongue may be formed with bosses or ribs on the opposite side surfaces adapted to engage the aperture in the floor of the frame and between the frame head portion and the pawl.

To minimize flexure of the pawl towards the head of the frame, the pawl is suitably formed on its side adjacent the head with a rib which serves to reduce the clearance for movement whilst allowing maintenance of adequate moulding clearances. Alternatively the pawl may be enlarged at its tip to define a re-entrant space between the pawl and the head, constricted at the tip of the pawl. A mould tool may be removed from such a space by resiliently springing the pawl away from the head.

The invention will now be described by way of example with reference to the accompanying partly diagrammatic drawings in which:

FIG. 1 is a fragmentary isometric view of the frame portion of a tie;

FIG. 2 is a sectional side elevation of the tie;

FIG. 3 is an end view of the tie taken from the right hand end of FIG. 2;

FIGS. 4 to 6 are respectively a fragmentary side elevation, plan and underside view of the tie frame portion of FIG. 1;

FIG. 7 is a partly sectional side elevation of a series of ties assembled in a stack;

FIG. 8 is a partly sectional side elevation of a tie being tightened about a cable bundle, and FIG. 9 is a partly sectional view of the tie of FIG. 5 after tightening and after a severing operation.

The cable tie of FIGS. 1 to 6 comprises a one-piece moulding of flexible plastics material having a strap portion 1 formed at one end with a frame 2. The frame 2 forms a passage 3 for the other, free end of the strap 1 as seen in FIGS. 8 and 9, when the strap is folded or looped back upon itself. The passage 3 is of width greater than the strap width to admit passage of the strap 1 which is suitably tapered at its free end in width (not shown) and thickness as seen in FIG. 2 to facilitate insertion.

The frame 2 is formed with a floor 4 which is generally co-planar with the strap as seen in FIG. 2. On the upper side as seen in FIG. 2 the floor 4 of the frame is flush with the strap upper surface and on the other side, the lower side in FIG. 2, the frame 2 projects from the strap lower surface and defines a box-like structure open at opposite ends as seen in FIG. 1. On the side opposite the strap 1 the frame 2 is formed with a tongue 5 generally forming an extension of the strap 1 and floor 4, the tongue being of width and thickness corresponding to that of the strap 1.

The frame 2 is formed on its face adjacent the strap 1, with an aperture 6 defining the entrance to passageway 3 and disposed between the floor 4 and a head 7 of the frame. The head 7 bridges a pair of parallel side walls 8 of the frame 2 which extend from the floor 4 and define sides of the passageway 3. The walls 8 extend beyond the head 7 towards the tongue 5, and, between the walls 8 the head 7 is formed with a latch 9 integrally joined to the head 7 by a resilient hinge portion 10. The latch 9 projects inwardly beyond the head 7 into the passageway 3. The inner end of the latch 9, facing the floor 4, is chamfered at an inclination towards the tongue end of the floor 4 and the latch 9 defines a resilient pawl for engaging ratchet teeth 11 formed in the strap 1, as seen in FIG. 2, on the opposite side of the strap 1 to that from which the frame 2 projects.

The ratchet teeth 11 extend across part only of the width of the strap 1 that width being greater than the width of the latch 9, within a longitudinal recess defined between side ribs 12 at sides of the strap 1. The strap on its other side is suitably of shallow channel form to define a section which is stable after moulding.

The pawl 9 at its tip on the side facing the tongue 5 is formed with a shoulder 13 or step serving slightly to reduce the thickness of the pawl tip and present an edge aligned with the tongue side of a rectangular aperture 14 in the floor 4 opposite the head. This facilitates formation of a clean edge to the pawl during moulding. The pawl 9 on the opposite side is formed with a central rib 15 extending centrally lengthwise of the pawl and partially bridging the gap between the pawl and the head 7. The rib 15 serves to reduce pivotal movement of the pawl towards the head whilst retaining adequate moulding clearances to facilitate manufacture.

The head 7 of the frame 2 is chamfered on the side facing the floor 4 in a similar sense to the chamfered end of the pawl 9 to define a convergent entrance to the passageway 3 at the same side of the frame 2 as the strap 1, to facilitate insertion of the free end of the strap 1. The rectangular aperture 14, which communicates with passage 3, provides access for mould tooling to form the latch 9, hinge 10 and head 7 on the side facing the floor 4. The floor 4 extends outwardly of the side walls 8 as seen in FIGS. 1 and 3 to define narrow side flanges 16 which at their ends facing the tongue 5 terminate flush with ends of the side walls 8 and at their other ends project beyond the head 7 for a short distance along the strap 1. The walls 8 at this end terminating with the flanges 16 and projecting on the strap side of the head 7 as wall portions 17. The wall portions 17 on their inner facing sides are formed with slots 18 extending throughout the wall height normally from the floor. The walls 8 on the other side of the head 7, at each side of the pawl 9 are thickened by fillet portions 19 which taper as seen in FIG. 3 from a maximum thickness at the free edges of the walls to merge with the wall sides closer to the floor 4. The fillet portions 19 serve to stiffen the head 7 in relation to the walls.

The tongue 5, on its side edges is formed with transverse ribs 20 of generally semi-circular section as seen in FIGS. 1, 5 and 6, and spaced from the adjacent ends of the side walls 8 by a distance corresponding to the displacement of the grooves 18 from the opposite wall ends 17.

The ratchet teeth terminate short of the free end of the strap and the end portion between the end of the ratchet teeth 11 and the free end of the strap is suitably tapered in width towards the free end, further to facilitate insertion of the free end into the aperture 6.

In use, in order to package a plurality of ties of the kind shown in FIGS. 1 to 6, the ties are suitably arranged in a stack as shown in FIG. 7 where like reference numerals refer to similar parts in FIGS. 1 to 6. Intermediate ties within the stack are arranged each with its tongue 5 entering the aperture 6 and passageway 3 of an adjacent, superposed tie. The ties are arranged with their strap portions 1 in parallel overlapping fashion and their frame portions 2 projecting downwardly in closely spaced overlapping fashion. The tongues 5 of the intermediate ties penetrate the passageways 3 to such extent that the ribs 20 engage the slots 18 of the associated tie in a snap fit. Some flexure of the wall portions 17 is caused by engagement of the ribs 20.

It is apparent from FIG. 4 that a stack of any desired number of ties may readily be formed by snap fitting successive ties to the stack which is convenient for compactness and economy of packaging and also for use in an automatic application tool, as described in our copending concurrent patent application Ser. No. 793,661 filed May 4, 1977.

In order to remove a tie from the stack for use it is convenient to hold all but the lowermost tie of the stack, as seen in FIG. 4, against movement and to push the head 2 of the lowermost tie, as indicated by the arrow with sufficient force to disengage the ribs 20 of the lowermost tie from their resilient engagement between wall portions 18 of the super-adjacent tie. This allows withdrawal of the tongue 5 to separate the lowermost tie from the stack.

In use of a tie about a bundle of conductors 21 as seen in FIG. 8, the strap 1 is looped about the bundle and its free end inserted through the passageway 3 to engage the ratchet teeth 11 with the latch pawl 9. The free end of the strap 1 is pulled as indicated by the arrow away from the frame 2 to tighten the strap to an appropriate tension about the bundle. As shown in FIG. 9, the latch pawl 9 engages a ratchet tooth 11 to resist reverse movement and relaxation of the strap portion about the bundle. The tongue 5 and the free portion of the strap 1 may then be severed flush with the frame 2 as indicated by the arrows.

Release of the latch pawl 9 by anti-clockwise rotation as seen in FIGS. 8 and 9 is resisted by compression of the strap 1 against the floor 4, and by engagement of the latch pawl 9 with the frame head 7. The side walls 8 and fillet portions 19 serve to stiffen the head 7 against forces tending to release the strap 1 from the latch pawl 9.

The side flanges 16 provide means for guiding the tie in a tool or tool magazine, and the wall portions 17 additionally serve to close the sides of a triangular space defined within the tie loop between the head 2 and bundle 21.

What is claimed is:

1. A bundle tie moulded from flexible plastics material and comprising a flexible strap extending from a frame at one end, the frame having an aperture for passage of the strap looped back upon itself and in which the frame has means for releasably engaging the frame of a similar, adjacent tie to form a stack in which the straps of the ties are generally parallel and extend forwardly from the frames in the same direction.

2. A bundle tie moulded from flexible plastics material and comprising an elongate flexible strap portion having an open frame at one end, the frame forming a passage into which the other end of the strap may be inserted and through which the strap may pass, the frame having pawl means for engaging the strap within the frame to resist its withdrawal in which the frame is provided with a tongue on a side of the frame opposite the strap and, on the side adjacent the strap, the frame is formed with an aperture complementary to the tongue and adapted releasably to engage the tongue of a second, similar tie with the strap portions of the ties in side-by-side overlapping relationship.

3. A cable tie as claimed in claim 2, in which the aperture for receiving the tongue also defines the passageway for receiving the other end of the strap, the passageway extending through the frame in a direction generally parallel to the strap and the tongue, the tongue effectively forming an extension of the strap on the opposite side of the frame.

4. A tie as claimed in claim 3, in which the frame extends from one face of the strap to a head portion spaced from the strap by the passageway, and formed on a side remote from the strap with the pawl means.

5. A tie as claimed in claim 4 in which the strap is formed on one face with serrations defining ratchet teeth adapted to engage a resilient pawl supported from the head of the frame and positioned within the aperture to resist withdrawal of the strap when looped back upon its length so that the other, free end enters the passageway at the one end of the strap.

6. A tie as claimed in claim 5 in which the serrations are recessed below the surrounding surface of the strap and on the opposite side the strap is of shallow channel form.

7. A tie as claimed in claim 4 in which the strap, frame, tongue and pawl are integrally formed in one piece and the floor of the frame opposite the latch and the head is formed with an aperture for access of mould tooling.

8. A tie as claimed in claim 7, in which the pawl is formed on its side adjacent the head with a projection which serves to reduce the clearance for movement towards the head.

9. A tie as claimed in claim 4, in which the free end of the tongue on the surface adjacent the projecting portion of the frame is chamfered to facilitate insertion into the aperture of a complementary tie.

10. A tie as claimed in claim 4, in which the head is chamfered on a side opposite the pawl means towards the floor of the frame.

11. A tie as claimed in claim 2, in which the tongue is formed with at least one transverse projection adapted releasably to engage a complementary recess in an engaged tie in a resilient snap fit to hold the ties in stacked relation.

12. A tie as claimed in claim 11, in which the tongue is formed with a pair of transverse projections, one on each side of the tongue, each comprising a rib at a side of the tongue and the tie frame is formed with opposite side wall portions on the strap side of the head and formed with a pair of opposed slots for receiving respective ribs of the tongue of an engaged tie.

* * * * *